United States Patent [19]

Caffes

[11] Patent Number: 4,482,432
[45] Date of Patent: Nov. 13, 1984

[54] APPARATUS FOR SOLID/LIQUID SEPARATION BY VAPORIZATION AND CONDENSATION

[75] Inventor: Peter J. Caffes, Silver Spring, Md.

[73] Assignee: The Caffes Trust (Irwin M. Aisenberg, Trustee), Washington, D.C.

[21] Appl. No.: 333,807

[22] Filed: Dec. 23, 1981

[51] Int. Cl.³ .................. B01D 1/24; C02F 1/08
[52] U.S. Cl. .................... 202/187; 202/205; 202/236; 202/267 R; 203/11; 203/86; 203/89; 203/DIG. 25; 159/43.1
[58] Field of Search .............. 203/11, 10, 89, 86, 203/91, DIG. 25; 202/187, 267, 236, 205; 159/13 A, DIG. 21; 196/128

[56] References Cited

U.S. PATENT DOCUMENTS

| | | | |
|---|---|---|---|
| 1,346,537 | 7/1920 | Flowers | 202/187 |
| 1,396,232 | 11/1921 | Pflugfelder | 202/236 |
| 2,514,943 | 7/1950 | Ferris et al. | 202/236 |
| 2,611,741 | 9/1952 | Thompson | 202/187 |
| 2,992,977 | 7/1961 | Greene et al. | 202/236 |
| 3,161,574 | 12/1964 | Elam | 203/86 |
| 3,163,587 | 12/1964 | Champe | 202/236 |
| 3,206,381 | 9/1965 | Neugebauer et al. | 202/236 |
| 3,505,172 | 4/1970 | Achener | 202/187 |
| 3,725,205 | 4/1973 | Heen | 202/187 |
| 4,285,776 | 8/1981 | Atwell | 202/187 |

FOREIGN PATENT DOCUMENTS 442449  8/1912  France ................. 202/187

Primary Examiner—Wilbur Bascomb
Attorney, Agent, or Firm—Berman, Aisenberg & Platt

[57] ABSTRACT

A continuous process of spreading a film of a solids/liquid admixture over walls of a chamber, maintaining a saturated vapor atmosphere within the chamber, vaporizing liquid of the film to provide the saturated vapor and solids, discharging the saturated vapor and solids from the chamber and condensing the discharged vapor is effected in a hollow module having two spaced-apart chambers, one within the other, and means to move saturated vapor from the inner chamber to the outer chamber.

10 Claims, 6 Drawing Figures

APPARATUS FOR SOLID/LIQUID SEPARATION BY VAPORIZATION AND CONDENSATION

THE TECHNICAL FIELD

Liquids are separated from solids by vacuum evaporation in a process and associated apparatus which permit application to such diverse materials as sea water and ordinary household waste (garbage and sewage).

BACKGROUND

There are many separation methods beyond those normally found in standard texts. Diverse evaporators and dryers have been employed to effect separation of liquids from solids with which they are admixed or otherwise associated.

Although "distillation" is commonly used in the sense of vaporizing a single constituent from a solution, e.g., distilling water, the term is properly applied only where vaporization of a liquid mixture yields a vapor phase containing more than one constituent, and it is desired to recover one or more of these constituents in a nearly pure state. Thus, the process of separating liquids from solids by vaporizing the liquid is properly referred to as evaporation or drying.

Caffes (U.S. Pat. No. 4,292,121) provides a single-chamber flash-evaporation and condensation apparatus to separate solids from a suspension, solution or other admixture of solids and liquid.

Angelucci (U.S. Pat. No. 1,885,402) concerns continuous evaporation or distillation apparatus for concentrating a liquid component under vacuum by vaporizing and then separately condensing water therefrom.

Although Thomas (U.S. Pat. No. 2,803,589) pertains to concentrating salt water and sludge and separating fresh water therefrom, his process comprises:

(a) heating to a high temperature at a pressure which prevents vaporization, (b) withdrawing in liquid phase under pressure, (c) spraying through a series of vertical flash evaporators or pressure containers and (d) separating liquid portions of two produced streams.

According to Waddill (U.S. Pat. No. 2,956,934) a flashed vaporized distillable material is passed in an elongated distillation zone from a flashing section at one end of the zone to an annulus surrounding a combination condensing-demisting zone substantially axially disposed in a mid-section of the distillation zone and then through the combination condensing-demisting zone, recovering condensate from within said condensing-demisting zone and recovering any non-condensables from the other end of the distillation zone.

Frank (U.S. Pat. No. 3,250,687) provides apparatus for film-type distillation in which liquid flows upon an evaporating surface in a relatively thin film; it is subjected to distillation in a spread-out condition, the distillate and distillate residue being separately collected.

Starmer (U.S. Pat. No. 3,444,049) uses a multi-staged evaporator comprising a vessel divided internally into a number of compartments by partitions serving as heat-transfer surfaces, in which means are provided for feeding liquid onto one side of each of the surfaces and in which distillate-collecting means are arranged on the other side of each surface. Vapor produced from the liquid can flow from one heat-transfer surface to another where it is condensed by giving up heat to liquid on the other side of the surface.

Webb (U.S. Pat. No. 3,791,934) has a multistage flash system which includes a continuous, downwardly spiralling, substantially enclosed passage with a plurality of transverse partitions dividing the passage into a series of flash evaporator stages through which flashing distill and flows during its passage from the top to the bottom end of the passage. A central core (around which the helical passage winds) contains a condensing section divided into a series of condenser stages (one above the other), each of which is in vapor communication with an adjacent flash stage in the helical passage.

To prevent adherence of precipitated solids to a contacted surface of apparatus for evaporating an aqueous solution containing dissolved solids, Erwin (U.S. Pat. No. 4,119,485) evaporates the solution in apparatus (wherein a hot contacted surface is preferentially oil wettable and zero absorbent of water from the solution) while continuously wetting the contacted surface with an organic liquid which is immiscible with the aqueous solution being evaporated, the contacted surface comprising a fluorocarbon polymer.

STATEMENT OF INVENTION

Houshold waste disposal for units of, e.g., from 1 to 50 or more families (with or without garbage disposals) constitutes an ongoing problem in areas in which sewage treatment is not readily available. A solution to this problem is provided by a method and apparatus which convert household (organic) waste (sewage and garbage) into dry innocuous solids and potable water. The same method and apparatus are also useful for other solid/liquid separations, e.g. obtaining fresh water and salt from brine, whether or not the solid is in dispersion, in solution or otherwise admixed with the liquid.

The apparatus comprises a module with two chambers (one within the other) which have their respective walls spaced apart from each other. Solids-containing liquid is spread as a film over interior walls of the inner chamber. By controlling temperature and pressure, a saturated-vapor atmosphere (of the liquid) is maintained throughout that chamber; a balance is sustained between solids-containing liquid introduced into and saturated vapor withdrawn from the inner chamber. Dried solids (left behind by the vaporized liquid), referred to herein as "pycno", are also withdrawn from the inner chamber.

Withdrawn saturated vapor is condensed in the outer chamber and collected as purified effluent.

The modules vary in size, based on processing requirements. From 0.5 to 6.0 gallons (about 1.8 to about 22.8 liters) per minute of household waste or more are processed in modules varying, e.g., from 8 feet 4 inches (about 2.54 meters) in height and 3.78 feet (about 1.15 meters) in diameter to 30.5 feet (about 9.3 meters) in height and 11.34 feet (about 3.46 meters) in diameter or larger.

Each module is a substantially-closed hollow unit with two similarly-(but not identically-)shaped imperforate chambers, a smaller inner chamber and a larger (surrounding) outer chamber. The outer chamber is defined by a space between outer walls of the two chambers.

In operation each module is preferably vertically oriented, with pycno and purified liquid being withdrawn from the bottom of the inner and outer chambers, respectively, and with saturated vapor and gas being transmitted from the top of the inner chamber into the corresponding part of the outer chamber.

Feed (solids/liquid admixture) to the module must be fluid in consistency and preferably in pureé or less viscous form. It is advantageously preliminarily ground, pulverized or finely screened and degassed prior to sheeting in a thin film over walls of the inner chamber, from which the liquid is vaporized.

Although the shape of the chambers is not critical, it is desirable for them to have substantially cylindrical sidewalls with a circular cross-section over a major portion of their height. The top and bottom portions are, e.g., appropriately dish-shaped or conical. To assure having the liquid film follow the sidewalls of the inner chamber, the diameter of that chamber is optionally reduced slightly from the top to the bottom so as to provide a narrower cross-section at the lower portion of the substantially cylindrical side walls.

To minimize heating, a substantially constant temperature within the inner chamber is maintained as close to 68° F. (20° C.) as feasible. A constant pressure, corresponding to that required to sustain a saturated vapor atmosphere of the liquid in the solids/liquid admixture, is similarly maintained in the inner chamber. When water is the liquid, the appropriate pressure (for a temperature of 20° C.) is 0.69 inch (17.5 mm) of Hg.

The outer chamber has a condenser to condense into liquid saturated vapor withdrawn from the inner chamber. The nature of the condenser is not critical, but it is conveniently merely a surface on which the saturated vapor impinges. The condenser is oriented so that condensed liquid remains in the outer chamber until discharged from a liquid (effluent) outlet.

Means are provided in the outer chamber to withdraw gas which is not condensed under operating (temperature and pressure) conditions. A build-up of non-condensible gas is thus precluded even if gas is produced from decomposing organic solids in the inner chamber.

For continuous operation and to achieve a balance between the amount of influent liquid and the amount of effluent saturated vapor, a fan (prime mover) is provided in a passage between the inner and outer chambers. The passage is advantageously in the form of a throat or cylindrical tube to control evaporation rate frome sidewalls of the inner chamber and flow rate of vapor from the inner to the outer chamber.

Side walls of the inner chamber are of a sufficient height and film thickness of the sheeted solids-containing liquid is controlled that virtually all, if not all, of the liquid is vaporized well before the liquid film reaches the pycno outlet from the inner chamber. When solids-accompanying liquid has been vaporized, the accompanying solids continue toward the pycno outlet, through which they are withdrawn from the inner chamber. The pycno withdrawal means is optionally similar to that disclosed in U.S. Pat. No. 4,292,121.

To facilitate moving solids toward the pycno outlet and to assist gravitational flow of the solids, the bottom portion of the inner chamber and, optionally, the side walls thereof are coated with a release agent or lubricant, such as Teflon or silicone.

The inside of the outer wall of the outer chamber is also advantageously coated with a similar release coating to protect the surface and to assist condensed liquid in its flow toward the effluent outlet.

Although construction materials are not crucial, the inner chamber is conveniently made of aluminium or steel, and the outer wall of the outer chamber is conveniently made of steel. For efficient operation the module is covered with insulation to minimize the influence of external variations in temperature.

DETAILS

Figure 1:
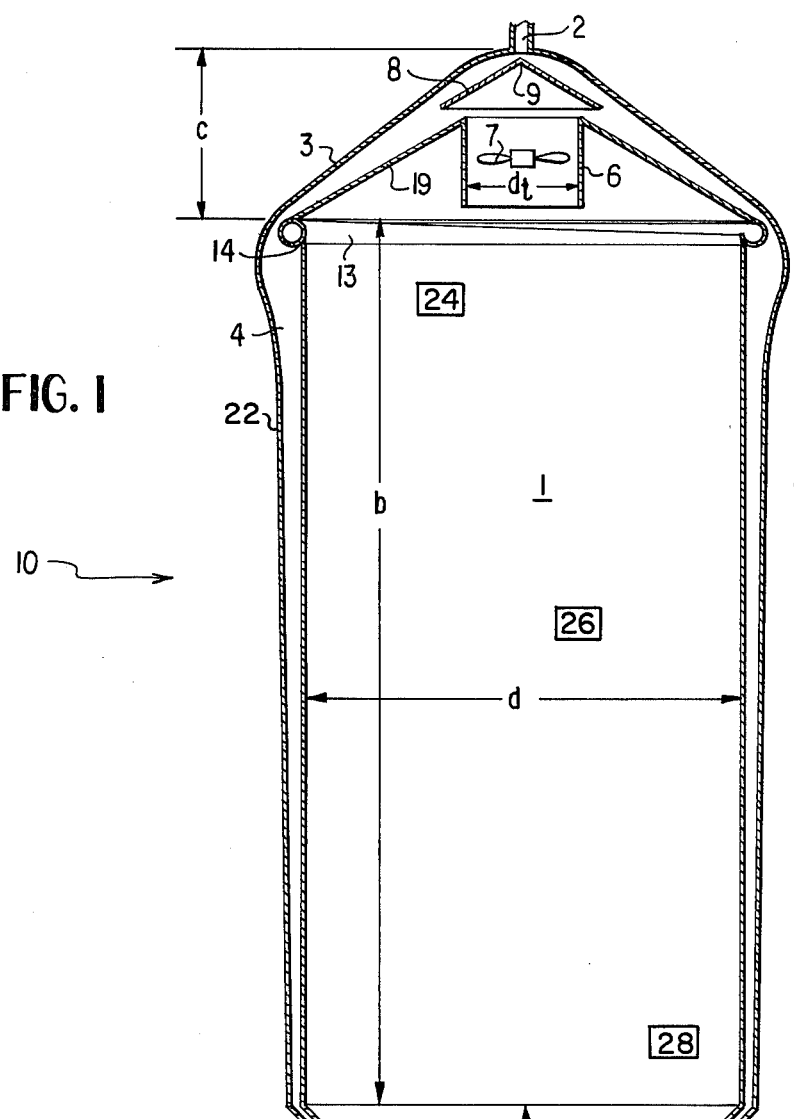
FIG. 1 is a cross-section of a module.
Figure 1A:
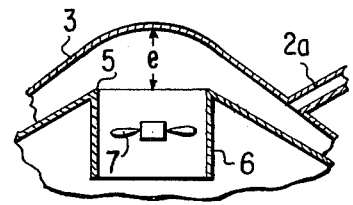
FIG. 1a is a cross-section of the upper portion of an alternative embodiment.
Figures 4, 5:
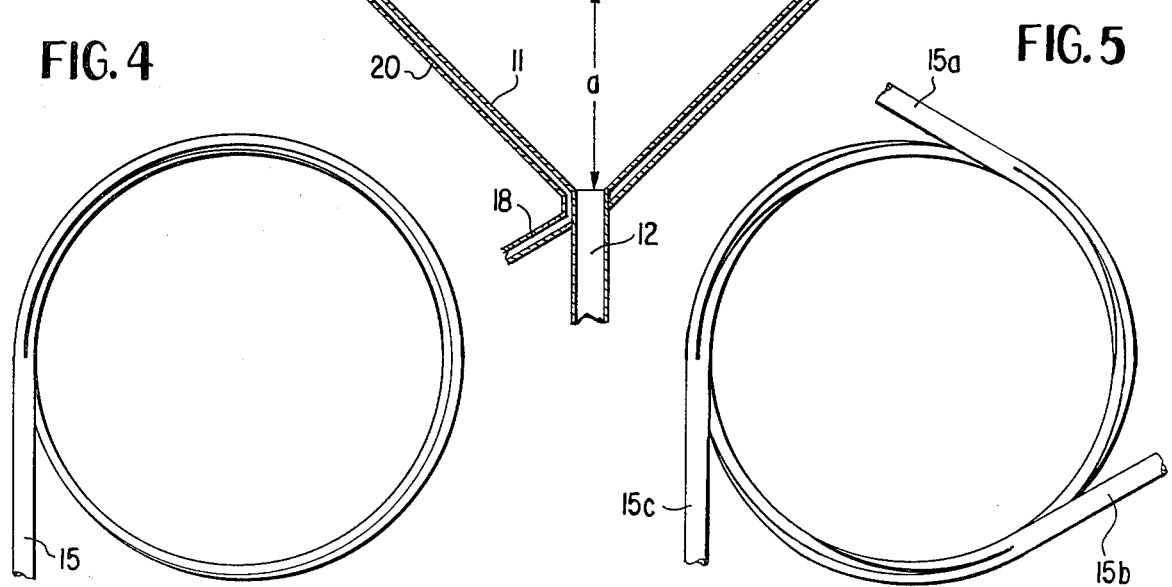
FIG. 4 is a top view of the feed structure shown in FIGS. 2 and 3.
FIG. 5 is a top view of a feed structure variant.
Figure 2:
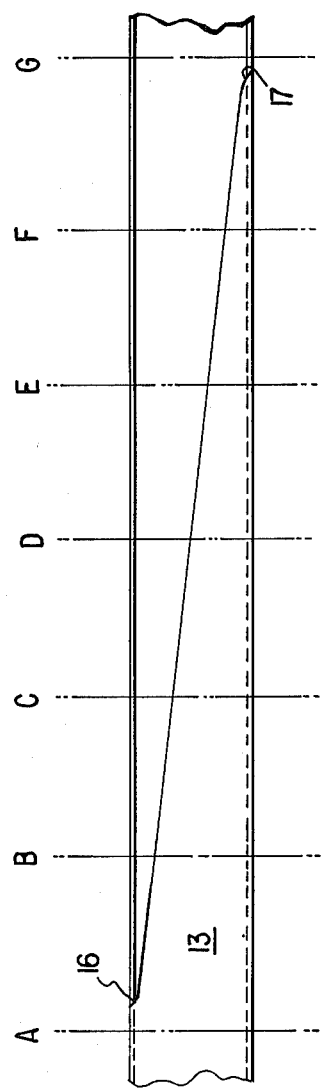
FIG. 2 is a plan view of straightened feed structure which partially or wholly surrounds the top of the inner chamber.
Figure 3:
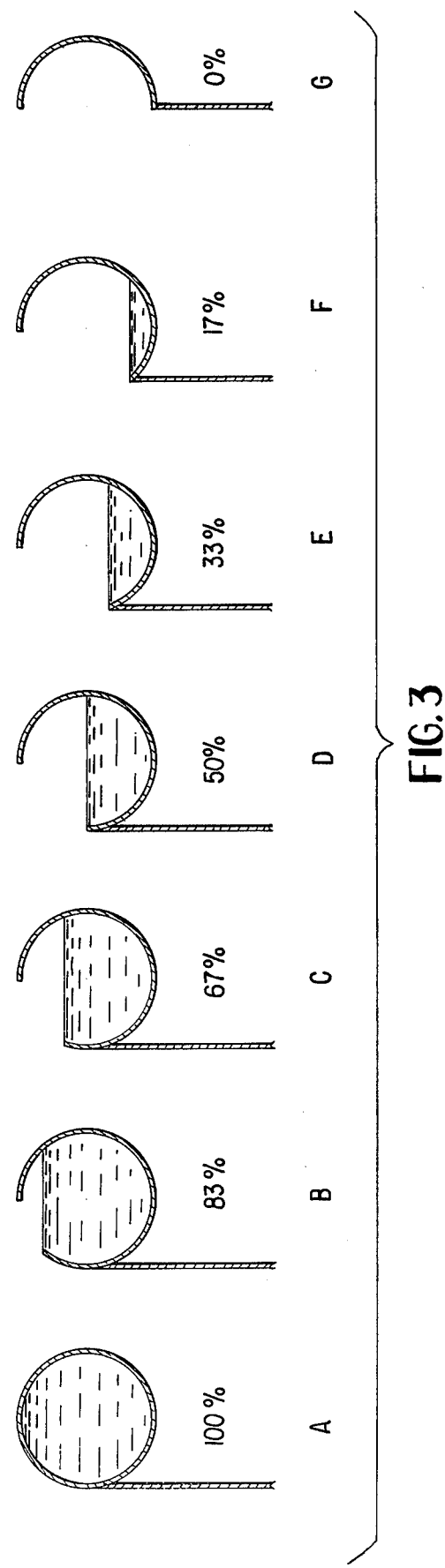
FIG. 3 comprises a series (A through G) of successive cross-sections from one end to the other of the feed structure of FIG. 2.

Although the size, capacity and configuration of the apparatus are subject to extensive variations, as is apparent to any artisan, a preferred general shape is that depicted by FIG. 1. For apparatus of such shape illustrative parameters are reflected in Table 1. For treating a solids/liquid composition wherein water is the liquid, the inner chamber (1) is advantageously maintained under saturated vapor conditions, e.g. at a temperature of 68° F. (20° C.) and under a pressure of 0.69 inch (17.5 mm) of Hg. The temperature and pressure are optionally concurrently varied over any desired range to maintain a saturated vapor atmosphere of the liquid for the solids/liquid composition being separated. The examples are provided for water, but appropriate conditions are readily determined for virtually any liquid by established procedures. Also, the noted preferred conditions are those wherein the temperature approximates room temperature so that heating and/or cooling is avoided or minimized.

A conventional vacuum pump is employed to impress the desired vacuum on the inner chamber (1). An outlet (2 or 2a) [e.g. with a 6-inch (15.24-cm) diameter] in the upper portion (3) of the outer chamber (4) is conveniently provided for this purpose. The outlet (2) is preferably at an elevation at the highest level of the inner chamber, but is optionally virtually anywhere (2a) in the top portion of the outer chamber (4).

The top portion of the outer chamber is advantageously conical in shape and extends about 9.5 inches (24.13 cm) or more above the uppermost part (5) of the inner chamber.

TABLE I

| Example | Module Dimensions | | |
|---|---|---|---|
| | 1 | 2 | 3 |
| Capacity (gpm) | 0.5 (1.89 l pm) | 3.0 (11.4 l pm) | 6.0 (22.7 l pm) |
| (a) | 2.25 ft. (0.686 m) | 3.5 ft. (1.07 m) | 5.0 ft. (1.52 m) |
| (b) | 4.5 ft. (1.37 m) | 15.5 ft. (4.72 m) | 21.67 ft. (6.61 m) |
| (c) | 1.58 ft. (0.482 m) | 2.75 ft. (0.838 m) | 3.83 ft. (1.17 m) |
| (d) | 4.5 ft. (1.37 m) | 7.75 ft. (2.36 m) | 11.0 ft. (3.35 m) |

TABLE I-continued

| Example | Module Dimensions | | |
|---|---|---|---|
| | 1 | 2 | 3 |
| (d$_l$) | 1.0 ft. (0.305 m) | 2.0 ft. (0.610 m) | 3.0 ft. (0.914 m) |
| (e) | 9.5 in. (0.241 m) | 9.5 in. | 9.5 in. |

When the outlet to the vacuum is above the throat (6) for the fan (7), a conical hood (8) [with its apex (9) away from the fan] should be interposed between the fan (7) and the vacuum outlet (2) to preclude saturated vapor from going through the vacuum outlet and condensed liquid from returning to the inner chamber. The conical hood acts as a condenser for the saturated vapor and extends beyond the throat opening. When a hood is used, it is advantageously from the uppermost portions (5) of the inner chamber by about 9.5 inches.

In practice vanes (not shown) are optionally provided in the throat (6) to direct saturated vapor flow into the outer chamber as desired.

The rate of saturated vapor flow through the throat from the inner chamber to the outer chamber can be varied extensively, e.g. from 3,000 to 5,000 ft.$^3$/min. or more, as can the throat diameter and the size and capacity of the fan. Exemplary flow rates are reflected in Table II.

TABLE II

| Saturated Vapor Flow | |
|---|---|
| Example 1 | |
| Throat (ft.$^3$/min.) | 3852 (109.1 m$^3$/min.) |
| Throat (ft./min.) | 4904 (1495 m/min.) |
| Inner Chamber (ft./min.) | 60.55 (18.46 m/min.) |
| Example 2 | |
| Throat (ft.$^3$/min.) | 23111 (654.4 m$^3$/min.) |
| Throat (ft./min.) | 3270 (996.6 m/min.) |
| Inner Chamber (ft./min.) | 122.5 (37.33 m/min.) |
| Example 3 | |
| Throat (ft.$^3$/min.) | 46222 (1309 m$^3$/min.) |
| Throat (ft./min.) | 6539 (1993 m/min.) |
| Inner Chamber (ft./min.) | 486.4 (148.2 m/min.) |

The influent (solids/liquid composition) which is being separated in the module (10) into its solid and liquid components is spread along the interior wall of the inner chamber in a thin film. This is accomplished in any suitable manner, but preferably without introducing air into the composition. Ideally, a uniform continuous film is spread over the entire circumference of the inner chamber, and the film progresses down the chamber wall while the liquid therein evaporates. All of the liquid is evaporated before the film reaches base section (11), but remaining solids continue to descend the wall to the pycno outlet (12), from which they are withdrawn.

A feed mechanism (13) suitable for spreading influent along the periphery of the inner chamber (1) is illustrated in FIGS. 1 to 5. Although such is not essential, the solids/liquid composition feed is preferably tangentially introduced along the periphery of the upper portion (14) of the inner chamber. The influent conduit (15) advantageously forms a ring around the entire perimeter at the same elevation. To facilitate forming a sheet or film of the solids/liquid composition along the entire periphery of the inner chamber wall, the influent conduit is partially cut away (cf. FIG. 3) so as to reduce the volume of contained fluid gradually from the point (16) of introduction into the inner chamber, completely around the chamber, to a point (17) immediately adjacent to the point of introduction. Alternatively, a plurality, e.g. three, of similar tangential feeds (15a, 15b, 15c) are equally spaced along the periphery at the same elevation.

The entire module (10) is appropriately insulated. Minimal or no insulation is required when the module is situated in a building maintained at 20° C. When it is exposed to significant temperature changes, however, adequate insulation must be provided for efficient operation. When insulated, the module is completely covered with suitable material which is preferably secured to its entire exterior surface.

Suitable insulation for temperature zone outdoor temperature variations includes, e.g., a 4-inch thick substantially uniform polyurethane foam having a density of about 1.25 pounds per cubic foot.

In one embodiment of the invention the outer chamber (4) is constructed of ASTM A36 carbon steel and has a 2-mil thick inside coating of Dow Corning (DC) 1-2577 release agent to facilitate conduction of condensed vapor to the condensed vapor discharge means (18). The inside shell [shell of chamber (1)] is constructed of 400 series stainless steel and is not coated. The inside base of the inner chamber is optionally provided with a 2-mil thick baked-on coating of DC 1-2577. A similar coating is optionally provided on the inner side walls of the inner chamber.

The overall structure comprises a substantially-closed hollow module (10) comprising two similarly-shaped imperforate chambers, a smaller inner chamber (1) and a larger outer chamber (4), respective walls of which are spaced from each other. The inner chamber has two opposed ends (11, 19), means (12) to withdraw solids from one end, means (6) to withdraw gas or vapor from the other end, means (7) to move gas or vapor from the inner chamber (1) to the outer chamber (4), means (15) to introduce a solids-containing liquid into the inner chamber and means (13) to spread the solids-containing liquid as a thin sheet or film over walls of the inner chamber.

The outer chamber has two opposed ends (3, 20), means (3) to receive gas or vapor from the inner chamber, means (3, 8) to condense vapor, means (2, 2a) to discharge non-condensed gas or vapor, means (18) to discharge condensed vapor and, preferably, an externally insulated outer wall (22).

The module itself is provided with conventional means (24) to maintain substantially constant temperature and pressure conditions within the inner chamber, conventional means (26) to vaporize liquid from the solids-containing liquid and conventional means (28) to maintain vaporized liquid in a substantially saturated state within the inner chamber.

The invention and its advantages are readily appreciated from the preceeding description. Various changes can be made in the process or apparatus without departing from the spirit or scope of the invention or sacrificing its material advantages. The feeding mechanism, the apparatus and the method hereinbefore described are merely illustrative of preferred embodiments of the invention.

What is claimed is:

1. A substantially-closed hollow module comprising two similarly-shaped imperforate chambers, a smaller inner chamber and a larger outer chamber, respective walls of which are spaced from each other;

the inner chamber being entirely within the outer chamber and having (a) two opposed ends, (b) means to withdraw solids from one end, (c) means to withdraw gas or vapor from the other end, (d) means therewithin, at said other end, to move gas or vapor directly from the inner chamber to the outer chamber, (e) means, at or near the other end, to introduce a solids-containing liquid continuously into said inner chamber, and (f) means to spread virtually all of the solids-containing liquid as a thin sheet or film over walls thereof;

the outer chamber completely surrounding the entire inner chamber and having (a) two opposed ends, (b) means to receive gas or vapor directly from the inner chamber at one end, (c) means to condense vapor, (d) means to discharge non-condensed gas or vapor from the one end, (e) means to discharge condensed vapor from the other end, and (f) an externally-insulated outer wall.

2. A module according to claim 1 in which the two chambers are substantially circular in cross-section over a major portion and have respective ends which are substantially conical or dish-shaped.

3. A module according to claim 1 wherein the inner chamber has a portion adjacent the one end with a release coating thereon to facilitate conduction of separated solids to the solid-withdrawal means.

4. A module according to claim 1 wherein the outer wall of the outer chamber has an inner surface with a release coating thereon to facilitate conduction of condensed vapor to the condensed-vapor discharge means.

5. A module according to one of claims 1 to 4 wherein the means to move gas or vapor is in a conduit within the inner chamber.

6. A module according to claim 5 having a capacity sufficient to produce from about 1.8 to about 22.8 liters per minute of solids-containing liquid, having means to produce and maintain a substantially constant temperature of about 20° C. within the inner chamber and having means to produce and maintain a substantially constant pressure of about 17.5 mm Hg within the inner chamber.

7. A module according to claim 5 wherein the inner chamber is surrounded by aluminum or steel walls and the outer chamber is surrounded by steel walls.

8. A substantially-closed hollow module comprising two similarly-shaped imperforate chambers, a smaller inner chamber entirely encompassed within a larger outer chamber, respective walls of which are spaced from each other;

the inner chamber having (a) two opposed ends, (b) means to withdraw solids from one end, (c) means to withdraw gas or vapor from the other end, (d) means, at said other end, to move gas or vapor from the inner chamber to the outer chamber, (e) means, at or near the other end, to introduce a solids-containing liquid into said inner chamber, and (f) conduit means to spread the solids-containing liquid as a thin sheet or film on and along a wall surface of the inner chamber, the wall surface being in direct flow communication with an opening in the conduit means, the conduit means being at a substantially constant elevation which is superior to at least a portion of the wall surface, the opening starting at substantially the highest elevation of the conduit means and gradually descending in a downstream direction to the lowest elevation thereof, said opening being situated in said conduit means in a manner so that liquid in the conduit means is directed toward and onto said wall surface;

the outer chamber having (a) two opposed ends, (b) means to receive gas or vapor from the inner chamber at one end, (c) means to condense vapor, (d) means to discharge non-condensed gas or vapor from the one end, (e) means to discharge condensed vapor from the other end, and (f) an externally-insulated outer wall.

9. In apparatus having (I) means to maintain substantially-constant temperature and pressure conditions within a chamber, (II) means to vaporize liquid and (III) means to maintain thus-vaporized liquid in a substantially-saturated state, a module according to claim 1 or claim 15 wherein means (I) are means to maintain the stated conditions within the inner chamber, means (II) are means to vaporize liquid from the solids-containing liquid, and means (III) are means to maintain a substantially-saturated vapor state within and throughout the inner chamber.

10. A module according to claim 1 or claim 8 having saturated vapor of the solids-containing liquid within and substantially filling the inner chamber, wherein said solids-containing liquid is in liquid form virtually only as a thin sheet or film on part of the wall surface.

* * * * *

UNITED STATES PATENT OFFICE
CERTIFICATE OF CORRECTION

PATENT NO. : 4,482,432
DATED : November 13, 1984
INVENTOR(S) : Peter J. CAFFES

It is certified that error appears in the above-identified patent and that said Letters Patent are hereby corrected as shown below:

Column 5, line 15, "from" should read --separated from--. Column 8, line 40, "claim 15" should read --claim 8--.

Signed and Sealed this

Twentieth Day of August 1985

[SEAL]

Attest:

DONALD J. QUIGG

Attesting Officer     Acting Commissioner of Patents and Trademarks